United States Patent
Sun et al.

(10) Patent No.: US 9,093,715 B2
(45) Date of Patent: Jul. 28, 2015

(54) MULTIMETALLIC NANOPARTICLE CATALYSTS WITH ENHANCED ELECTROOXIDATION

(71) Applicant: Brown University, Providence, RI (US)

(72) Inventors: Shouheng Sun, East Greenwich, RI (US); Sen Zhang, Providence, RI (US); Huiyuan Zhu, Providence, RI (US); Shaojun Guo, Providence, RI (US)

(73) Assignee: Brown University, Providence, RI (US)

( * ) Notice: Subject to any disclaimer, the term of this patent is extended or adjusted under 35 U.S.C. 154(b) by 0 days.

(21) Appl. No.: 13/793,432

(22) Filed: Mar. 11, 2013

(65) Prior Publication Data
US 2013/0236815 A1 Sep. 12, 2013

Related U.S. Application Data

(60) Provisional application No. 61/609,245, filed on Mar. 9, 2012.

(51) Int. Cl.

| | | |
|---|---|---|
| B01J 23/40 | (2006.01) | |
| B01J 23/42 | (2006.01) | |
| B01J 23/58 | (2006.01) | |
| B01J 23/00 | (2006.01) | |
| B01J 21/18 | (2006.01) | |
| B01J 23/74 | (2006.01) | |
| C22C 38/00 | (2006.01) | |
| C22C 38/16 | (2006.01) | |

(Continued)

(52) U.S. Cl.
CPC .............. *H01M 4/928* (2013.01); *H01M 4/921* (2013.01); *H01M 4/926* (2013.01); *Y02E 60/50* (2013.01)

(58) Field of Classification Search
CPC ............ B01J 21/18; B01J 23/40; B01J 23/42; B01J 23/52; B01J 23/58; B01J 23/00; B01J 23/74; B01J 23/8906; C22C 5/02; C22C 5/04; C22C 38/00; C22C 38/16
USPC ............ 502/185, 326, 330, 331, 353; 420/82, 420/89, 463, 466
See application file for complete search history.

(56) References Cited

U.S. PATENT DOCUMENTS

4,716,087 A * 12/1987 Ito et al. ......................... 429/498
4,970,128 A * 11/1990 Itoh et al. ...................... 429/498
5,702,836 A * 12/1997 Ma et al. ....................... 429/506

(Continued)

OTHER PUBLICATIONS

Supporting Information for Zhang et al., "Structure-Induced Enhancement in Electrooxidation of Trimetallic FePtAu Nanoparticles," J. Am. Chem. Soc. 2012, vol. 134, pp. 5060-5063.*

(Continued)

*Primary Examiner* — Patricia L Hailey
(74) *Attorney, Agent, or Firm* — Lawson & Weitzen, LLP; Sonia K. Guterman; Michael I. Falkoff (57) ABSTRACT

A new structure-control strategy to optimize nanoparticle catalysis is provided. The presence of Au in FePtAu facilitates FePt structure transformation from chemically disordered face centered cubic (fcc) structure to chemically ordered face centered tetragonal (fct) structure, and further promotes formic acid oxidation reaction (FAOR). The fct-FePtAu nanoparticles show high CO poisoning resistance, achieve mass activity as high as about 2810 mA/mg Pt, and retain greater than 90% activity after a 13 hour stability test.

10 Claims, 9 Drawing Sheets

(51) Int. Cl.
*C22C 5/04* (2006.01)
*H01M 4/92* (2006.01)

(56) References Cited

U.S. PATENT DOCUMENTS

| | | | |
|---|---|---|---|
| 6,262,129 B1 * | 7/2001 | Murray et al. | 516/33 |
| 7,687,428 B1 * | 3/2010 | Zhong et al. | 502/184 |
| 8,038,763 B2 * | 10/2011 | Eichhorn et al. | 75/351 |
| 8,178,463 B2 * | 5/2012 | Stamenkovic et al. | 502/101 |
| 8,252,953 B2 * | 8/2012 | Wan | 562/17 |
| 2004/0126267 A1 * | 7/2004 | DiSalvo et al. | 420/466 |
| 2007/0160899 A1 * | 7/2007 | Atanassova et al. | 429/44 |
| 2009/0075139 A1 * | 3/2009 | Kucernak et al. | 429/30 |

OTHER PUBLICATIONS

Guo et al. "Synthesis of Ultrathin FePtPd Nanowires and Their Use as Catalysts for Methanol Oxidation Reaction" J Am Chem Soc, 2011, vol. 39, pp. 15354-15357.

Ji et al. "Nanocrystalline intermetallics on mesoporous carbon for direct formic acid fuel cell anodes" Nat Chem, 2010, vol. 2, pp. 286-293.

Kang et al. "Synthesis, self-assembly, and magnetic properties of [FePt]1-xAux nanoparticles" IEEE Trans Magn, 2003, vol. 39, pp. 2753-2757.

Kim et al. "Structurally Ordered FePt Nanoparticles and Their Enhanced Catalysis for Oxygen Reduction Reaction" J Am Chem Soc, 2010, vol. 132, pp. 4996-4997.

Kinge et al. "Low-Temperature Solution Synthesis of Chemically Functional Ferromagnetic FePtAu Nanoparticles" Nano Lett, 2009, vol. 9, pp. 3220-3224.

Mu et al. "Controllable Pt Nanoparticle Deposition on Carbon Nanotubes as an Anode Catalyst for Direct Methanol Fuel Cells" J Phys Chem B, 2005, vol. 109, pp. 22212-22216.

Snyder et al. "Oxygen reduction in nanoporous metal-ionic liquid composite electrocatalysts" Nat Mater, 2010, vol. 9, pp. 904-907.

Sun "Recent Advances in Chemical Synthesis, Self-Assembly, and Applications of FePt Nanoparticles" Advanced Materials, 2006, vol. 18, pp. 393-403.

Sun et al. "Monodisperse FePt Nanoparticles and Ferromagnetic FePt Nanocrystal Superlattices" Science, 2000, vol. 287, pp. 1989-1992.

Yin et al. "Shape-Selective Synthesis and Facet-Dependent Enhanced Electrocatalytic Activity and Durability of Monodisperse Sub-10 nm Pt—Pd Tetrahedrons and Cubes" J Am Chem Soc, 2011, vol. 133, pp. 3816-3819.

Yu et al. "Recent advances in direct formic acid fuel cells (DFAFC)" J Power Sources, 2008, vol. 182, pp. 124-132.

Zhang et al. "Electrostatic Self-Assembly of a Pt-around-Au Nanocomposite with High Activity towards Formic Acid Oxidation" Angew Chem, Int Ed, 2010, vol. 49, pp. 2211-2214.

Zhang et al. "Structure-Induced Enhancement in Electrooxidation of Trimetallic FePtAu Nanoparticles," J Am Chem Soc 2012, vol. 134, pp. 5060-5063.

* cited by examiner

MULTIMETALLIC NANOPARTICLE CATALYSTS WITH ENHANCED ELECTROOXIDATION

RELATED APPLICATION

The present application claims the benefit of U.S. provisional application Ser. No. 61/609,245 filed in the U.S. Patent and Trademark Office Mar. 9, 2012 entitled "Multimetallic nanoparticle catalysts with enhanced electrooxidation", inventors Shouheng Sun, Sen Zhang, Shaojun Guo, Huiyuan Zhu, and Dong Su, which is hereby incorporated by reference herein in its entirety.

GOVERNMENT FUNDING

This invention was supported in part by the U.S. Department of Energy, Office of Energy Efficiency and Renewable Energy, Fuel Cell Technologies Program. The invention was supported also by the U.S. Department of Energy, Office of Basic Energy Sciences, under Contract number DE-AC02-98CH10886. The government has certain rights in this invention.

TECHNICAL FIELD

Compositions and methods for structure-induced enhancement in electrooxidation by trimetallic FePtAu nanoparticle (NP) catalysts are provided.

BACKGROUND

Advances in the area of nanoparticle (NP) synthetic methodology have allowed synthesis of different platinum based monodisperse metallic NPs for use as catalysts. However, these platinum based NP catalysts suffer from several disadvantages in fuel cell catalysis. These catalysts are unstable in the corrosive electrochemical environment and prone to deactivation by reaction intermediate species such as carbon monoxide. Therefore, there is a need for synthesizing NP catalysts with enhanced durability and enhanced activity for practical use in fuel oxidation reactions.

SUMMARY

Novel multimetallic nanoparticle (NP) catalyst compositions with enhanced stability, and enhanced activity for catalyzing an electrooxidation reaction, and methods of manufacturing and using the same are provided.

An embodiment of the invention provides a multimetallic NP catalyst composition for catalyzing an electrooxidation reaction including: Iron (Fe); Platinum (Pt) or Palladium (Pd); and at least one additional metal, such that the catalyst is stable in a corrosive environment of the electroxidation reaction. In related embodiments the NP catalyst composition is such that the at least one additional metal is selected from the group of: copper (Cu) such that the catalyst is FePtCu; silver (Ag) such that the catalyst is FePtAg; antimony (Sb) such that the catalyst is FePtSb; bismuth (Bi) such that the catalyst is FePtBi; and, gold (Au) such that the catalyst is FePtAu. In another embodiment of the composition the trimetallic FePtAu NP catalyst is monodisperse. For example, the deviation in the diameter of the monodisperse NP is smaller than 10%.

In related embodiments of the composition the trimetallic FePtAu NP catalyst has a chemically ordered face-centered tetragonal (fct) structure, in which Fe and Pt atoms alternate in atomic layers along one direction and Au is enriched on the surface of the FePtAu NP. In related embodiments of the trimetallic FePtAu NP catalyst the average size of the FePtAu NP is about 3.8-4.2 nm.

In another embodiment of the composition including a trimetallic FePtAu NP catalyst above, the catalyst has a mass activity of at least 2600 milliampere/milligram (mA/mg) Pt. For example, the mass activity is about 2810 mA/mg Pt. In related embodiments of the trimetallic FePtAu NP catalyst the catalyst mass activity after a 13 hour j-t test of current density as a function of applied potential is about 50-60%, 60-70%, 70-80%, and 80-90% of initial mass activity.

Another embodiment of the invention provides a method of manufacturing FePtAu NP catalyst including: co-reducing platinum acetylacetonate ($Pt(acac)_2$) and chloroauric acid hydrate ($HAuCl_4 \cdot xH_2O$) by mixing each in a solvent in the presence of oleylamine and tetradecylphosphonic acid, and heating to form a solution; adding iron pentacarbonyl ($Fe(CO)_5$) to the solution and further heating the solution, thereby thermally decomposing ($Fe(CO)_5$) and obtaining NPs; separating by precipitation and purifying the NPs thereby obtaining as-synthesized NPs; and, annealing the as-synthesized NPs at a high temperature, whereby surfactant materials on or coating the as-synthesized NPs are removed, and the as-synthesized NPs are converted by a high temperature transition from a structure that is chemically disordered face centered cubic, fcc-FePtAu, to a chemically ordered face centered tetragonal, fct-FePtAu, thereby obtaining the FePtAu NP catalyst. In an alternative embodiment of the method adamantanecarboxylic acid is used in place of tetradecylphosphonic acid. In a related embodiment the method further includes obtaining a spectrum of the FePtAu NP catalyst by inductively coupled plasma-atomic emission spectroscopy.

Related embodiments of the method include obtaining NPs by selecting a molar ratio of components ($Pt(acac)_2$), ($HAuCl_4 \cdot xH_2O$) and ($Fe(CO)_5$) to control the composition of the FePtAu NP catalyst. The as-synthesized NPs are annealed at a temperature range of about 400-650° C. for about 1 hour. Annealing can take place at either one temperature within this range or in a stepwise manner from lower to higher temperatures within the range.

Embodiments of method above further include prior to annealing, depositing the as-synthesized NPs on a solid support, such as Ketjen carbon support, to prevent aggregation/sintering of the NPs during the high temperature annealing.

Another embodiment of the invention provides a method of using trimetallic FePtAu NP catalyst for promoting a formic acid oxidation reaction (FAOR), the method including oxidizing formic acid (HCOOH) in an electrochemical cell in the presence of $N_2$-saturated sulfuric acid ($H_2SO_4$) and the NP catalyst. For example, the concentration of $H_2SO_4$ is 0.1 to 1.0 molar (M). For example, the concentration of HCOOH is 0.1 to 2.0 M. In a related embodiment of the method of using a trimetallic FePtAu NP catalyst, the catalyst has a chemically ordered face-centered tetragonal (fct) structure, in which Fe and Pt atoms alternate in atomic layers along one direction and Au is enriched on the surface of the FePtAu NP. According to an aspect of the method the oxidizing of HCOOH is essentially due to direct oxidation of HCOOH to $CO_2$.

Another embodiment of the invention provides a method of using trimetallic FePtAu NP catalyst for promoting a methanol ($CH_3OH$) oxidation reaction, the method comprising oxidizing methanol in an electrochemical cell in the presence of $N_2$-saturated sulfuric acid ($H_2SO_4$) and the NP catalyst. For example, the concentration of $H_2SO_4$ is 0.1 to 1.0 M. For example, the concentration of $CH_3OH$ is 0.1 to 2.0 M. In related embodiments of the method, the trimetallic FePtAu NP catalyst has a chemically ordered face-centered tetragonal (fct) structure, in which Fe and Pt atoms alternate in atomic layers along one direction and Au is enriched on the surface of the FePtAu NP.

BRIEF DESCRIPTION OF THE DRAWINGS

FIG. 1 panel A is a TEM image of as-synthesized 4 nm $Fe_{43}Pt_{37}Au_{20}$ NPs deposited on amorphous carbon-coated Cu grid.

FIG. 1 panel B is a TEM image of fcc-$Fe_{43}Pt_{37}Au_{20}$/C NPs deposited on the Ketjen carbon support, and annealed under 95% Ar+5% $H_2$ at 400° C. for one hour (h).

FIG. 1 panel C, is a TEM image of a representative fcc-$Fe_{43}Pt_{37}Au_{20}$/C NP deposited on the Ketjen carbon support, and annealed under 95% Ar+5% $H_2$ at 400° C. for one h.

FIG. 1 panel D is a TEM image of fct-$Fe_{43}Pt_{37}Au_{20}$NPs deposited on the Ketjen carbon support, and annealed under 95% Ar+5% $H_2$ at 600° C. for one h.

FIG. 1 panel E is a TEM image of a representative fct-$Fe_{43}Pt_{37}Au_{20}$/C NP deposited on the Ketjen carbon support, and annealed under 95% Ar+5% $H_2$ at 600° C. for one h.

FIG. 1 panel F is a set of five traces of XRD of FePtAu NPs at 2 theta degrees (abscissa). The NPs were deposited on the Ketjen carbon support and annealed under 95% Ar+5% $H_2$ for 1 h. The first and second XRD patterns from the bottom are those of as-synthesized $Fe_{55}Pt_{45}$ and $Fe_{43}Pt_{37}Au_{20}$ NPs, respectively. The third and fourth XRD from the bottom are those of $Fe_{43}Pt_{37}Au_{20}$ NPs annealed at 500 and 600° C., respectively (stars denote the fct-FePt peaks). The first XRD pattern from the top is that of $Fe_{34}Pt_{34}Au_{32}$ NPs annealed at 600° C. (arrows denote the Au peaks).

FIG. 2 panel A is a high-angle annular dark field (HAADF) STEM image of a representative fcc-$Fe_{43}Pt_{37}Au_{20}$NP.

FIG. 2 panel B is a simultaneous 2D mapping annular dark field (ADF) image of the NP shown in FIG. 2 panel A obtained using the STEM-EELS method.

FIG. 2 panel C is a simultaneous 2D mapping image of the NP shown in FIG. 2 panel A obtained using the STEM-EELS method.

FIG. 2 panel D is a superposition of images of FIG. 2 panels B and C. The figure shows that in the fcc-structure Fe is uniformly distributed.

FIG. 2 panel E is a high-angle annular dark field (HAADF) STEM image of a representative fct-$Fe_{43}Pt_{37}Au_{20}$ NP.

FIG. 2 panel F is a simultaneous 2D mapping annular dark field (ADF) image of the NP shown in FIG. 2 panel E obtained using the STEM-EELS method.

FIG. 2 panel G is a simultaneous 2D mapping image of the NP shown in FIG. 2 panel E obtained using the STEM-FELS method.

FIG. 2 panel H is a superposition of images of FIG. 2 panels F and G. The figure shows that in the fct-structure Fe is concentrated in the core region and Au/Pt are rich in the shell structure.

FIG. 2 panel I is a STEM-EDS line scan across a fcc-$Fe_{43}Pt_{37}Au_{20}$ NP. The inset shows the NP scanned. The upper dark trace corresponds to Au, the middle light trace corresponds to Pt and the lower dark trace corresponds to Fe.

FIG. 2 panel J is a STEM-EDS line scan across a fct-$Fe_{43}Pt_{37}Au_{20}$ NP. The inset show the NPs scanned. The dark trace having one peak at each of the left and the right hand extreme corresponds to Au. The trace in the middle with the highest peak corresponds to Fe. The light trace corresponds to Pt.

FIG. 4 panel A is a set of cyclic voltammograms of three different kinds of fct-FePtAu NPs in $N_2$-saturated 0.5 M $H_2SO_4$ solution. The black, dark and light curves correspond to cyclic voltammograms of fct-$Fe_{34}Pt_{34}Au_{32}$, fct-$Fe_{43}Pt_{37}Au_{20}$, and fct-$Fe_{43}Pt_{37}Au_{20}$ NPs respectively.

FIG. 4 panel B is a set of J-V curves of fct-FePtAuNPs of different compositions. The black, dark, and light curves correspond to fct-$Fe_{34}Pt_{34}Au_{32}$, fct-$Fe_{43}Pt_{37}Au_{20}$, and fct-$Fe_{42}Pt_{44}Au_{14}$ NPs respectively.

FIG. 4 panel C is a set of J-V curves for the fct-$Fe_{43}Pt_{37}Au_{20}$ NPs annealed at three different temperatures 400° C. (black), 500° C. (light), and 600° C. (dark).

FIG. 4 panel D is a set of J-V curves of specific activity of fct-$Fe_{43}Pt_{37}Au_{20}$ (dark), fct-$Fe_{55}Pt_{45}$ (light) and commercial Pt catalysts (black).

FIG. 4 panel E is a plot of J-V curves of mass activity of fct-$Fe_{43}Pt_{37}Au_{20}$NPs.

FIG. 4 panel F is a plot of J-V curves of the fct-$Fe_{43}Pt_{37}Au_{20}$ NPs before (light) and after (dark) a13 h J-t stability test.

FIG. 5 panel A is a TEM image of 4 nm $Fe_{55}Pt_{45}$ NPs.

FIG. 5 panel B is a TEM image of 4 nm $Fe_{42}Pt_{44}Au_{14}$ NPs.

FIG. 5 panel C is a TEM image of 4 nm $Fe_{34}Pt_{34}Au_{32}$NPs.

FIG. 7 panel A is a graph of CVs with different compositions of fct-FePtAu NPs in $N_2$-saturated 0.5 M $H_2SO_4$ solution. The different NP compositions are: fct-$Fe_{42}Pt_{44}Au_{14}$ (black), fct-$Fe_{43}Pt_{37}Au_{20}$ (dark), and fct-$Fe_{34}Pt_{34}Au_{32}$ (light).

FIG. 7 panel B is a graph of j-t curves of fct-FePtAu NPs showing change in specific activity of the NP catalysts as a function of time. The NPs have the compositions: fct-$Fe_{42}Pt_{44}Au_{14}$ (light), fct-$Fe_{43}Pt_{37}Au_{20}$ (dark), and fct-$Fe_{34}Pt_{34}Au_{32}$ (black).

FIG. 8 panel A is a graph of CVs of $Fe_{43}Pt_{37}Au_{20}$ NPs annealed at different temperatures, 400° C. (black), 500° C. (light), and 600° C. (dark), with potentials scanned from −0.25 to 1.0 V.

FIG. 8 panel B is a graph of j-t curves of fcc-$Fe_{43}Pt_{37}Au_{20}$ NPs (black) and fct-$Fe_{43}Pt_{37}Au_{20}$ (dark) NPs in $N_2$-saturated 0.5 M $H_2SO_4$ solution.

FIG. 12 is a graph of CVs of (top closed curve), fcc-$Fe_{43}Pt_{37}Au_{20}$ (second closed curve from the top), fct-$Fe_{55}Pt_{45}$ (light closed curve), and commercial Pt NPs (third closed curve from the top) in the $N_2$-saturated 0.5 M $H_2SO_4$ and 0.5 M methanol solution. In the methanol oxidation reaction, two oxidation peaks are usually observed. The stronger peak in the forward scan is related to the direct methanol oxidation. The smaller peak in the backward scan is associated with the oxidation of the carbonaceous species formed on the catalyst surface in the forward scan. The ratio of the forward peak current ($I_f$) to the backward peak current ($I_b$), $I_f/I_b$, is used as an index to measure the catalyst tolerance to the poisoning species such as carbon monoxide (CO). A higher ratio indicates more effective removal of the poisoning species on the catalyst surface. The CV from the fct-$Fe_{43}Pt_{37}Au_{20}$ NPs has an Oh value of 2.8, while for the fcc-$Fe_{43}Pt_{37}Au_{20}$, fct-$Fe_{55}Pt_{45}$ and commercial Pt NP catalysts, the values drop to 1.62, 1.20, and 0.71 respectively.

DETAILED DESCRIPTION OF THE EMBODIMENTS

In a fuel cell such as a hydrogen fuel cell, hydrogen atoms are broken down into protons and electrons at one electrode (anode). The electrons move through an external circuit to the other electrode (cathode) producing an electric current, where the incoming electrons, free protons and oxygen combine to form water. The catalyst currently used in commercial fuel cells is largely platinum. Platinum is not abundant, thereby making the catalyst expensive. Substitution of platinum with platinum alloys has not resulted so far in catalysts having high activity and durability.

Described herein are compositions and methods that provide a new structure-control strategy to tune and optimize nanoparticle (NP) catalysis for fuel oxidations. NPs, especially multimetallic NPs, can adopt different crystal structures. For example, as synthesized from a high-temperature solution-phase reaction, monodisperse binary FePt NPs have the chemically disordered face-centered cubic (fcc) structure, in which Fe and Pt atoms randomly occupy the fcc crystal lattice (Sun, S. H. et al. *Science* 2000, 287, 1989-1992). Upon further annealing, the fcc structure is converted into the chemically ordered face-centered tetragonal (fct) structure, in which Fe and Pt atoms form alternating atomic layers stacked along one specific direction (Sun, S. H. et al. *Science* 2000, 287, 1989-1992). Such a structure conversion in FePt results in a drastic magnetic property change from superparamagnetism to ferromagnetism (Sun, S. H. *Adv. Mater.* 2006, 18, 393-403), and in chemical stability increase in acid solutions (Kim, J. et al. *J. Am. Chem. Soc.* 2010, 132, 4996-4997).

The chemical stability increase associated with transition from fcc-FePt to fct-FePt was used in the compositions and methods described herein to produce NP catalysts for electrooxidation reactions with simultaneous enhancement in both activity and durability. Described herein are monodisperse trimetallic FePtAu NPs. The presence of Au in FePtAu facilitates FePt structural transformation from fcc to fct, with Au becoming enriched on the fct-FePt surface, and further promotes formic acid oxidation reaction (FAOR), which is the anode reaction that is used to power direct formic acid fuel cells (Yu, X. and Pickup, P. G. *J. Power Sources* 2008, 182, 124-132). Compared to Pt and FePt NP catalysts, the fct-FePtAu NPs herein show high CO poisoning-resistance, achieve mass activity of 2809.9 mA/mg Pt, and retain 92.5% of this activity after a 13 hour stability test. These properties make the fct-FePtAu NPs described herein the most active and durable catalyst reported till date.

In the methods described herein FePtAu NPs were synthesized by co-reduction of $Pt(acac)_2$ and $HAuCl_4$ and thermal decomposition of $Fe(CO)_5$ in the presence of tetradecylphosphonic acid (or adamantanecarboxylic acid) and oleylamine. Monodisperse 4 nm FePtAu NPs were obtained in which Fe/Pt/Au compositions were readily controlled by the metal precursor ratios. FePt NPs are typically synthesized by reduction of platinum acetylacetonate and decomposition of iron pentacarbonyl in the presence of oleic acid and oleylamine stabilizers (Sun, S. H. et al. *Science* 2000, 287, 1989-1992). According to the methods herein synthesis of FePtAu NPs of desired size and Fe/Pt/Au composition was carried out by using tetradecylphosphonic acid or adamantanecarboxylic acid, in place of oleic acid. In the compositions and methods described herein the Fe/Pt ratio is kept near 1:1 to facilitate fcc-fct phase transformation, (Sun, S. H. et al. *Science* 2000, 287, 1989-1992) and different percentages of Au are used so that the Au composition-dependent fcc-fct transition, and Au-dependent formic acid oxidation reaction (FAOR) catalysis may be analyzed.

Figure 5:
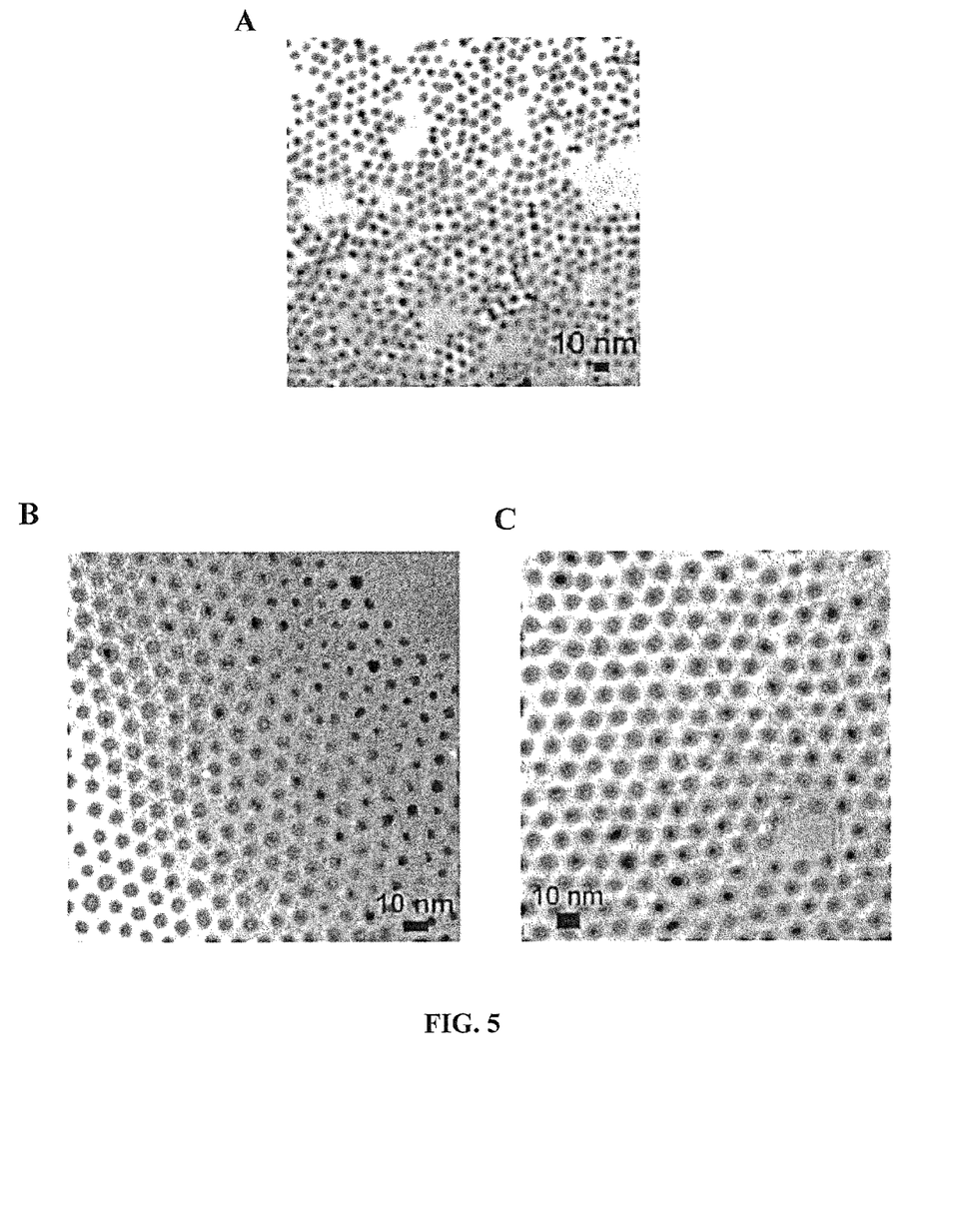
FIG. 5 is a set of TEM images.

In the method for manufacture of FePtAu herein excess $Fe(CO)_5$ was added to function both as a reducing agent and as a Fe precursor for its alloying with Pt and Au. Oleylamine and tetradecylphosphonic acid (or adamantanecarboxylic acid), were used to stabilize the NPs. The composition of FePtAu NPs (Table 1) was controlled by varying the molar ratios of $Pt(acac)_2$, $HAuCl_4.xH_2O$, and $Fe(CO)_5$, and were analyzed by inductively coupled plasma-atomic emission spectroscopy (ICP-AES). 4 nm $Fe_{55}Pt_{45}$ NPs were synthesized similarly without the presence of Au salt. Transmission electron microscopy (TEM) images show that the as-synthesized FePt and FePtAu NPs have an average size of 4±0.2 nm for $Fe_{55}Pt_{45}$ (FIG. 5A), 4±0.2 nm for $Fe_{42}Pt_{44}Au_{14}$ (FIG. 5B), 4±0.2 nm for $Fe_{43}Pt_{37}Au_{20}$ (FIG. 1A), and 4±0.3 nm for $Fe_{34}Pt_{34}Au_{32}$ NPs (FIG. 5C).

TABLE 1

| Composition of FePtAu NPs | | |
|---|---|---|
| Sample | $Pt(acac)_2/HAuCl_4$ molar ratio | As-synthesized NPs |
| A | 3:1 | $Fe_{42}Pt_{44}Au_{14}$ |
| B | 3:2 | $Fe_{43}Pt_{47}Au_{20}$ |
| C | 3:3 | $Fe_{34}Pt_{34}Au_{32}$ |

Figure 1:
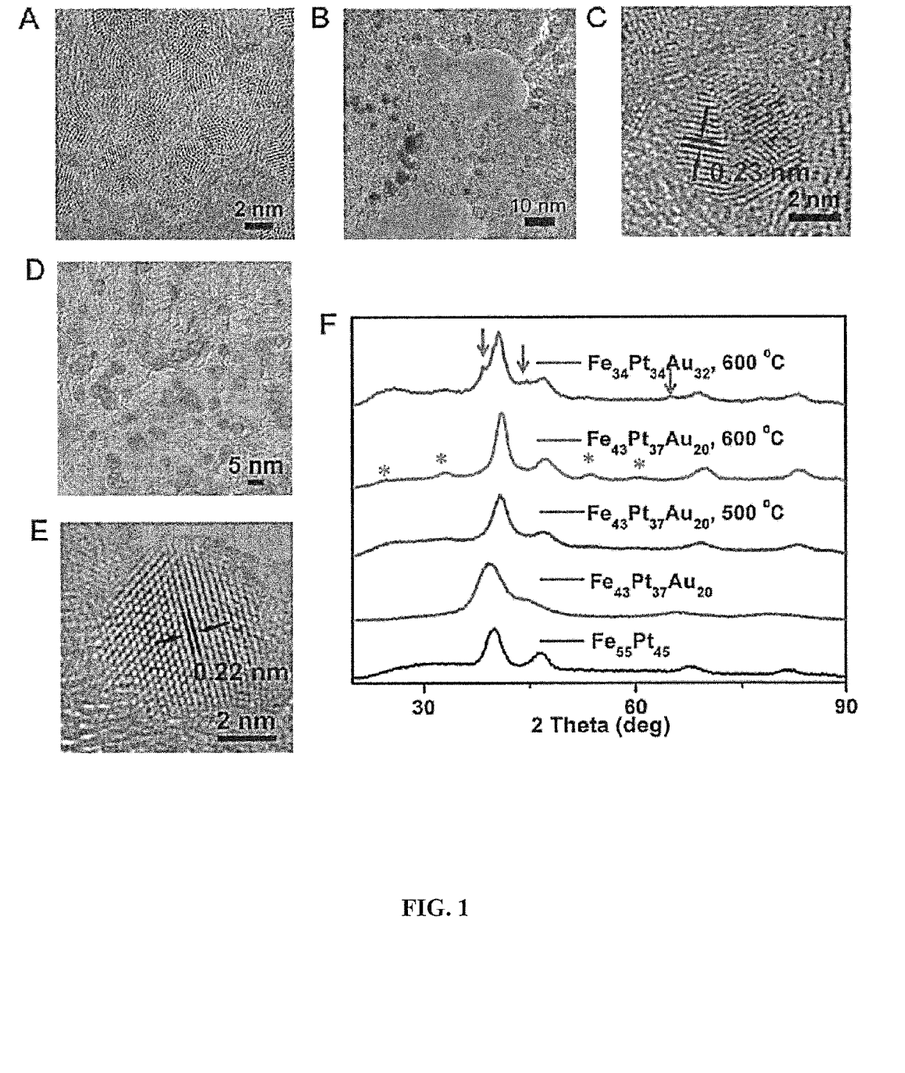
FIG. 1 is a set of transmission electron microscopy (TEM) images and a graph of X-ray diffraction (XRD) patterns of FePtAu NPs.

In the methods herein the as-synthesized NPs were annealed at high-temperature to remove surfactants present around NPs and to convert the fcc-FePtAu to fct-FePtAu. To prevent NPs from aggregation under these annealing conditions, and to facilitate the catalytic studies, the as-synthesized NPs were deposited on Ketjen carbon (C) support before the annealing (Example 3). FIG. 1 panels B and C show the typical TEM and high-resolution (HR) TEM images of the fcc-$Fe_{43}Pt_{37}Au_{20}$ NPs annealed under 95% Ar+5% $H_2$ at 400° C. for 1 h. The fcc-$Fe_{43}Pt_{37}Au_{20}$ NPs have an average size of 4±0.2 nm and (111) lattice fringe distance at 0.23 nm. Upon annealing at 600° C. for 1 h, the fcc-$Fe_{43}Pt_{37}Au_{20}$ NPs are converted to fct-$Fe_{43}Pt_{37}Au_{20}$ NPs, as shown in the TEM and HRTEM images (FIG. 1 panels D and E) of the NPs. The NP morphology integrity observed in these TEM images indicates that the FePtAu NPs deposited on the carbon support are well protected against aggregation/sintering during the high temperature annealing treatments.

Figure 2:
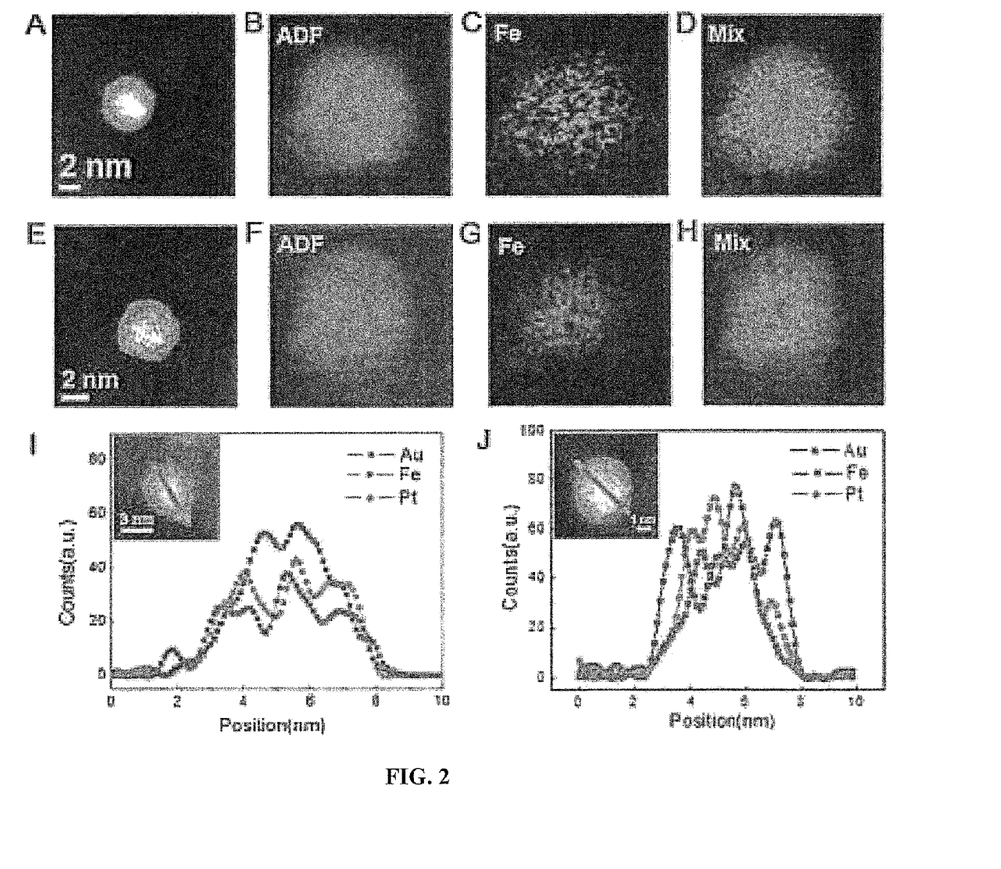
FIG. 2 is a set of scanning transmission electron microscopy (STEM) and STEM-electron energy-loss spectroscopy (STEM-EELS) images, and STEM-energy dispersive X-ray spectroscopy (STEM-EDS) line scans of FePtAu NPs.
Figure 3:
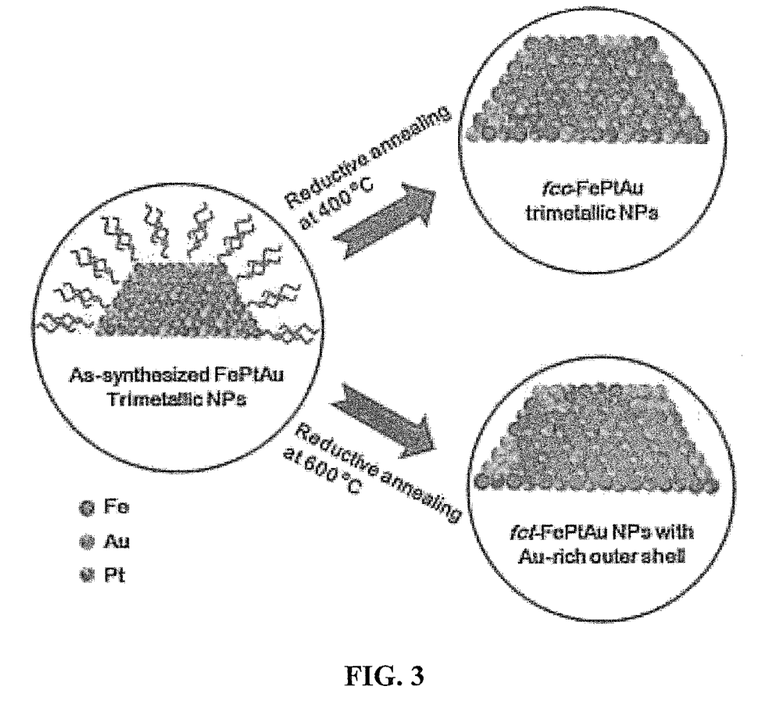
FIG. 3 is a schematic illustration of the structural change of the FePtAu NPs upon annealing. Annealing at 400° C., results in FePtAu NPs having a structure which is fcc, and annealing at 600° C., results in fct-FePtAu NP and Au segregates on the NP surface.

The carbon-supported $Fe_{43}Pt_{37}Au_{20}$ NPs produced according to methods herein and annealed at 400 and 600° C. respectively were further characterized by atomically resolved aberration-corrected scanning transmission electron microscopy (STEM), STEM-electron energy-loss spectroscopy (STEM-EELS), and STEM-energy dispersive X-ray spectroscopy (STEM-EDS). FIG. 2 panel A is a high-angle annular dark field (HAADF) image of a representative fcc-$Fe_{43}Pt_{37}Au_{20}$ NP, and FIG. 2 panels B-D show the corresponding Fe elemental mapping of the NP obtained using the STEM-EELS method. These analyses indicate that Fe in the fcc structure is uniformly distributed. In contrast, the HAADF image and the corresponding Fe elemental mapping of the fct-$Fe_{43}Pt_{37}Au_{20}$ NP (FIG. 2 panels E-H) show that Fe is concentrated in the core region and Au/Pt are rich in the shell structure. The STEMEDS line scans confines that Au alloys uniformly with Fe and Pt in the fcc-$Fe_{43}Pt_{37}Au_{20}$ NPs (FIG. 2 panel I), but in the fct-$Fe_{43}Pt_{37}Au_{20}$ structure it diffuses out and concentrates around the shell (FIG. 2 panel J). Based on the STEM-EELS and STEM EDS analyses, the annealing-induced structure change of FePtAu is illustrated in FIG. 3. Annealing at 400° C. favors formation of the fcc structure in FePtAu NPs. At 600° C., the fcc-FePtAu is converted to fct-FePtAu, with Au segregating on the FePt NP surface. The structure pattern observed here for fct-FePtAu NPs shows the physical basis of enhanced activity and durability for FAOR.

In general, compositions and methods herein provide a new structure control strategy to tune and optimize FePtAu NP catalysis for FAOR. These NPs are synthesized by a facile solution-phase process with their compositions controlled by the molar ratios of the metal precursors. The presence of Au in FePt facilitates the FePt structure transformation from fcc to fct and further promotes the FAOR in the $H_2SO_4$ solution. Among the NP catalysts made from either Pt, FePt or FePtAu NPs and tested, the 4 nm fct-$Fe_{43}Pt_{37}Au_{20}$ NPs were the most active and durable catalyst: they have a mass activity of 2809.9 mA/mg Pt and retain 92.5% of this activity after 13 h j-t stability test. The high CO-resistant activity of the fct-$Fe_{43}Pt_{37}Au_{20}$ NPs is attributed to surface segregation of Au from the fct-FePt, and the high durability is the result of the formation of the fct structure promoted by Au-segregation within the FePtAu NPs.

Figure 12:
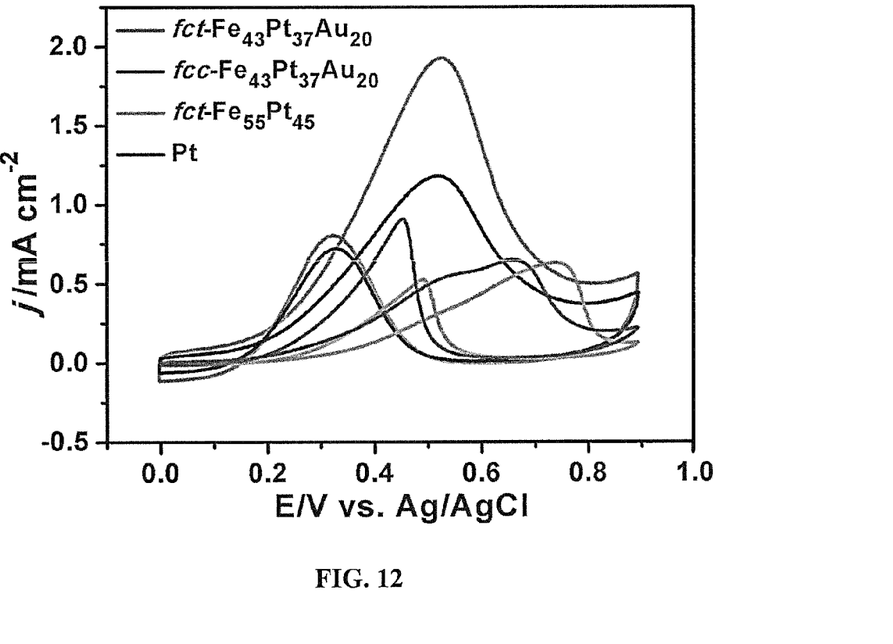

Data from examples herein show that fct-$Fe_{43}Pt_{37}Au_{20}$ NPs are also active for catalyzing methanol oxidation reactions with a high CO-tolerance activity (FIG. 12). Thus, as exemplified herein fct-FePtAu NPs are highly efficient catalysts for electrooxidation reactions of organic molecules. More importantly, the structure-control strategy is not limited to FePtAu NPs but can be extended to other M-doped FePtM (e.g., M=Cu, Ag, Sb; Sun, S. H. *Adv. Mater.* 2006, 18, 393-403), or Pt and Pd-based multimetallic NPs, providing a general approach to advanced NP catalysts with simultaneous enhancement in both activity and durability for practical applications.

As used herein "formic acid oxidation reaction" refers to an electrooxidation reaction that takes place at an anode in which formic acid oxidized releasing $CO_2$ and hydrogen in a dehydrogenation reaction (direct pathway), or one in which CO and $H_2O$ is formed prior to the formation of $CO_2$ and hydrogen (dehydration reaction).

The term "mass activity" as used herein refers to current density in $mA/cm^2$ per amount of Pt in $mg/cm^2$ present in the catalyst.

The term "specific activity" as used herein refers to current density ($mA/cm^2$) per $cm^2$ of the accessible electrochemical surface area of catalyst in an electrode.

As used herein, the term "cyclic voltammogram" refers to a graph showing the results of a cyclic voltammetry experiment, in which the electrode potential of a working electrode is ramped linearly versus time until a set potential is reached. Then the working electrode's potential ramp is inverted. The current at the working electrode is plotted versus the applied voltage to give the cyclic voltammogram trace.

A skilled person will recognize many suitable variations of the methods to be substituted for or used in addition to those described above and in the claims. It should be understood that the implementation of other variations and modifications of the embodiments of the invention and its various aspects will be apparent to one skilled in the art, and that the invention is not limited by the specific embodiments described herein and in the claims. Therefore, it is contemplated to cover the present embodiments of the invention and any and all modifications, variations, or equivalents that fall within the true spirit and scope of the basic underlying principles disclosed and claimed herein.

Incorporated herein by reference in its entirety is an article entitled "Structure-Induced Enhancement in Electrooxidation of Trimetallic FePtAu Nanoparticles", authors Sen Zhang, Shaojun Guo, Huiyuan Zhu, Dong Su and Shouheng Sen, published in the *Journal of American Chemical Society* 2012, vol. 134, 5060-5063.

The invention now having been fully described above, additional embodiments are found in the claims herein which are exemplary and not to be construed as further limiting. The contents of all literature and patent documents cited herein are hereby incorporated herein by reference.

EXAMPLES

Example 1

Synthesis of FePtAu Nanoparticles (NPs)

FePtAu NPs were synthesized by co-reducing of $Pt(acac)_2$ and $HAuCl_4$ and thermally decomposing $Fe(CO)_5$ in the presence of oleylamine, and tetradecylphosphonic acid or adamantanecarboxylic acid. Under a flow of $N_2$, 73 mg of platinum acetylacetonate ($Pt(acac)_2$, 0.188 mmol, Aldrich, 98%) and 22 mg of chloroauric acid hydrate ($HAuCl_4.xH_2O$, 0.063 mmol, 99.9%, Strem Chemicals) were mixed in 20 mL of octadecene (ODE, Aldrich, 90%) in the presence of 0.68 mL of oleylamine (OAm, 2 mmol, Aldrich, 70%) and 140 mg of tetradecylphosphonic acid (TDPA, 1 mmol, Alfa Aesar, 98%). The mixture was stirred magnetically and heated to 100° C. resulting in a light yellow transparent solution. Under a $N_2$ blanket, 0.10 mL of iron pentacarbonyl ($Fe(CO)_5$, 0.75 mmol, Aldrich, 99.9+%) was added into the solution, inducing in the solution an immediate color change to black.

The solution was heated to 250° C. at a rate of about 20° C./min and maintained at 250° C. for 10 min, then was cooled to room temperature to obtain NPs. The NPs were precipitated by adding isopropanol (50 mL) and were separated by centrifugation (8500 rpm, 8 min). The NPs were further purified by dispersing into hexane (20 mL) and centrifuging (5000 rpm, 8 min) to remove un-dispersed precipitates.

The product obtained was observed to be free of un-dispersed precipitates, and was then precipitated by adding ethanol (50 mL), and the mixture was centrifuged (8500 rpm, 8 min), and the precipitate was re-dispersed in hexane. This procedure yielded NPs having a composition $Fe_{42}Pt_{44}Au_{14}$. Different amounts of $Pt(acac)_2$ and $HAuCl_4$ were used to obtain NPs having a variety of ratios of Pt and Au. To obtain NPs of $Fe_{43}Pt_{37}Au_{20}$ 61 mg of $Pt(acac)_2$ (0.156 mmol) and 32 mg of $HAuCl_4$ (0.094 mmol) were used. $Fe_{34}Pt_{34}Au_{32}$ NPs were obtained using 49 mg of $Pt(acac)_2$ (0.125 mmol) and 43 mg of $HAuCl_4$ (0.125 mmol). $Fe_{55}Pt_{45}$ NPs were obtained using 98 mg of $Pt(acac)_2$ (0.25 mmol) without addition of $HAuCl_4$.

Example 2

Characterization of Nanoparticle Structure

Nps were characterized using inductively coupled plasma-atomic emission spectroscopy (ICP-AES). The ICP-AES measurements were carried out on a JY2000 Ultrace ICP-Atomic Emission Spectrometer equipped with a JY AS 421 auto sampler and 2400 g/mm holographic grating. X-ray diffraction (XRD) characterizations were carried out on a Bruker AXS D8-Advanced diffractometer with Cu Kα radiation (λ=1.5418 Å). Samples for TEM analysis were prepared by depositing a single drop of diluted NP dispersion in hexane on amorphous carbon coated copper grids. TEM images were obtained (FIG. 5B) using a Philips CM 20 (200 kV) transmission electron microscope. High resolution transmission electron microscopy (HRTEM) images were obtained using a FEI Titan 80-300 (300 kV) transmission electron microscope (FEI, Oregon, U.S.) with an aberration (image) corrector. Scanning transmission electron microscopy (STEM) analyses were performed using a Hitachi HD2700C (200 kV) with a probe aberration-corrector, in the Center for Functional Nanomaterials at Brookhaven National Laboratory. The two dimensional (2D) electron energy-loss spectroscopy (EELS) mapping data were collected using a high resolution Gatan-Enfina ER with a probe size of 1.3 Å and the energy dispersive X-ray analysis (EDX) line-scan was obtained by a Bruker-AXS X-Flash 5030 silicon drift detector with an electron probe of ~2 Å. A power law function was used for electron energy-loss spectroscopy EELS background subtraction.

Example 3

Structure Transition of FePtAu Nanoparticles

Figure 6:
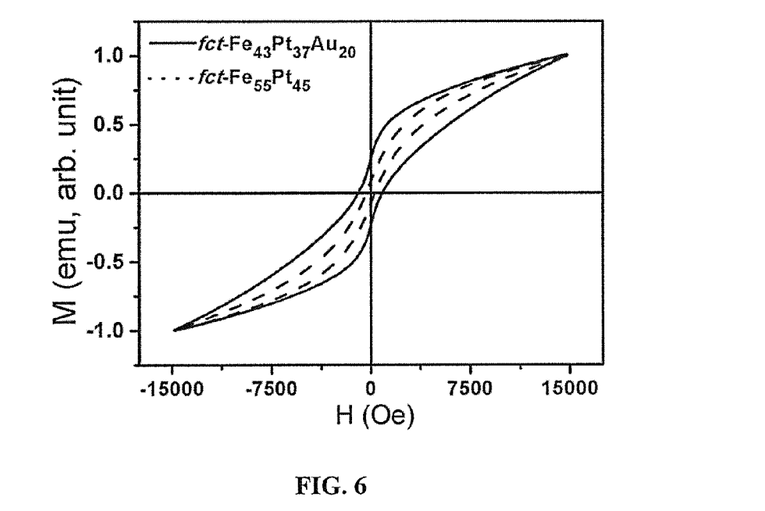
FIG. 6 is a graph of hysteresis loops of the 4 nm fct-$Fe_{55}Pt_{45}$ NPs (dot curve) and fct-$Fe_{43}Pt_{37}Au_{20}$ NPs (solid curve) at room temperature. Applied magnetic field (Oe) and magnetization (emu) are plotted along the X- and Y-axis respectively.

Structure transition of the FePt and FePtAu NPs was monitored by X-ray diffraction (XRD) patterns of the NPs deposited on C (FIG. 1 panel F). The as-synthesized $Fe_{43}Pt_{37}Au_{20}$ NPs, which have a size of about 4 nm, showed a typical fcc pattern with broadened and small angle shifted peaks compared to the 4 nm fcc-$Fe_{55}Pt_{45}$ NPs, indicating that Au-doping in FePt induced reduction of crystal coherence length and increase of crystal lattice spacing. Annealing at 400° C. or 500° C. for 1 hour (h) resulted in $Fe_{43}Pt_{37}Au_{20}$ NPs having a fcc structure. Upon annealing at 600° C. for 1 h, fcc-$Fe_{43}Pt_{37}Au_{20}$ was converted to partially ordered fct-$Fe_{43}Pt_{37}Au_{20}$. Associated with this change of structure, the fct-$Fe_{43}Pt_{37}Au_{20}$ NPs were observed to become ferromagnetic and show a coercivity of ~1000 Oe at room temperature. In contrast, the 4 nm $Fe_{55}Pt_{45}$ NPs annealed at the same temperature were observed to have a coercivity of only ~300 Oe (FIG. 6). Since the $Fe_{43}Pt_{37}Au_{20}$ and $Fe_{55}Pt_{45}$ NPs are not magnetically saturated, the coercivity values measured from the hysteresis loops are the low-end numbers and were used to demonstrate only the FePt structure conversion. The coercivity values are expected to be higher upon magnetically saturating of the NPs under a stronger magnetic field. The difference in coercivity between annealed $Fe_{43}Pt_{37}Au_{20}$ and $Fe_{55}Pt_{45}$ NPs indicates that Au segregation from the FePtAu structure helped to create lattice vacancies within the 4 nm FePtAu structure, promoting Fe/Pt rearrangement. These data are consistent with Au doping effect on FePt structure transformation (Kinge, S. et al. *Nano Lett.* 2009, 9, 3220-3224; Kang, S. *IEEE Trans. Magn.* 2003, 39, 2753-2757).

Results from methods herein showed that the fct structure formation within FePtAu is Au composition-dependent, with Au in 20% (by atomic percentage) range forming better chemical order within the FePt structure. Adding more Au to the FePtAu structure produced no benefit for fcc-fct transition, as the $Fe_{34}Pt_{34}Au_{32}$ NPs annealed at 600° C. exhibit weaker/broader fct peaks than the $Fe_{43}Pt_{37}Au_{20}$ NPs (FIG. 1 panel F).

Example 4

Preparation of C/NP Catalysts

Equal amounts (20 mg each) of NPs and Ketjen carbon support were mixed in 50 mL of hexane/acetone (v/v 1/1) and sonicated with an ultrasonic bath (Fisher Scientific FS 110) for 1 hour. The C/NPs were separated by centrifugation and washed twice with hexane. The C/NPs were dried under ambient conditions and annealed at different temperatures for 1 hour in a gas flow of $Ar+5\% H_2$. The commercial C/Pt (20% mass loading, 2.5-3.5 nm in diameter) catalysts were obtained from Fuel Cell Store (SanDiego, Calif.).

Example 5

Electrochemical Measurements

Electrochemical measurements were performed on a Pine Electrochemical Analyzer, Model AFCBP1 with a three-electrode system consisting of a glassy carbon (GC) working electrode (5-mm in diameter), an Ag/AgCl reference electrode (10% $KNO_3$), and a platinum wire counter electrode. To prepare C/NP-modified GC working electrodes, C/NP NPs were dispersed in a mixture of water/2-propanol/5% Nafion (v/v/v=1/4/0.025) under sonication to form a 4 mg/mL (for commercial C/Pt or C/Pd catalyst) or 2 mg/mL (for all the other catalysts) catalyst ink (Guo, S. et al. *J. Am. Chem. Soc.* 2011, 39, 15354-15357). An amount of 20 μL of the catalyst ink was dropped onto the surface of the GC electrode, and then dried under ambient conditions. $N_2$-saturated 0.5 M $H_2SO_4$ was used as the test solution. In the CV measurements, the electrode potential was scanned in the range from −0.2 to 0.9 V (vs. Ag/AgCl). Chronoamperometry was carried out at the constant potential of 0.2 V in an electrolyte solution containing 0.5 M $H_2SO_4$ and 0.5 M HCOOH. All the catalyst electrodes were cleaned before data collection with a steady-state CV in the range from −0.25 to 1.0 V (vs Ag/AgCl). The scan rate was fixed at 50 mV/s.

Example 6

Effect of Au on FAOR

Figure 4:
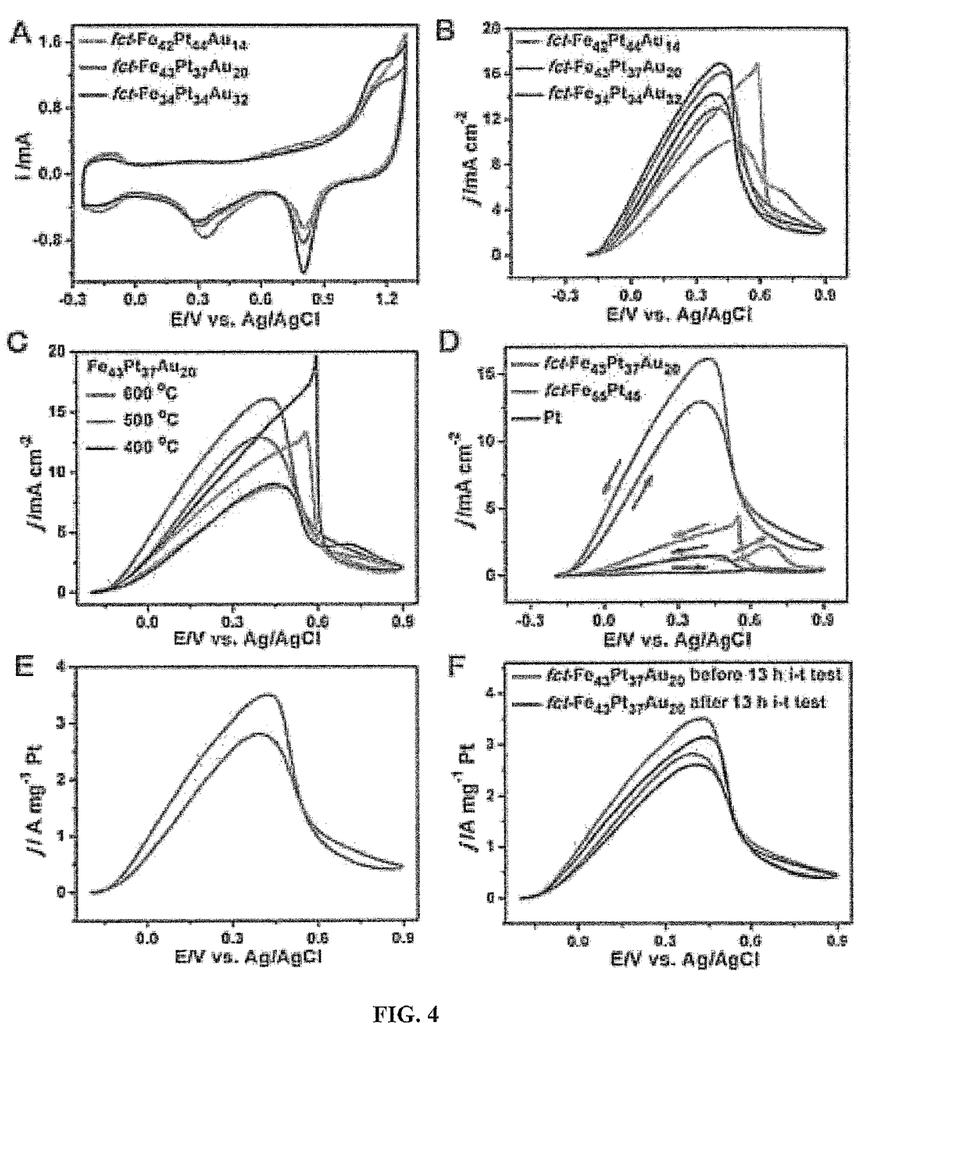
FIG. 4 is a graph depicting a set of cyclic voltammograms (CVs), and other graphs each having a set of J-V curves obtained by plotting current density (J) against the applied potentials (V) of FePtAu NPs. The experiments were performed in $N_2$-saturated 0.5 M $H_2SO_4$ (for CV curves) and 0.5 M $H_2SO_4$+0.5 M HCOOH solutions (for J-V curves).
Figure 7:
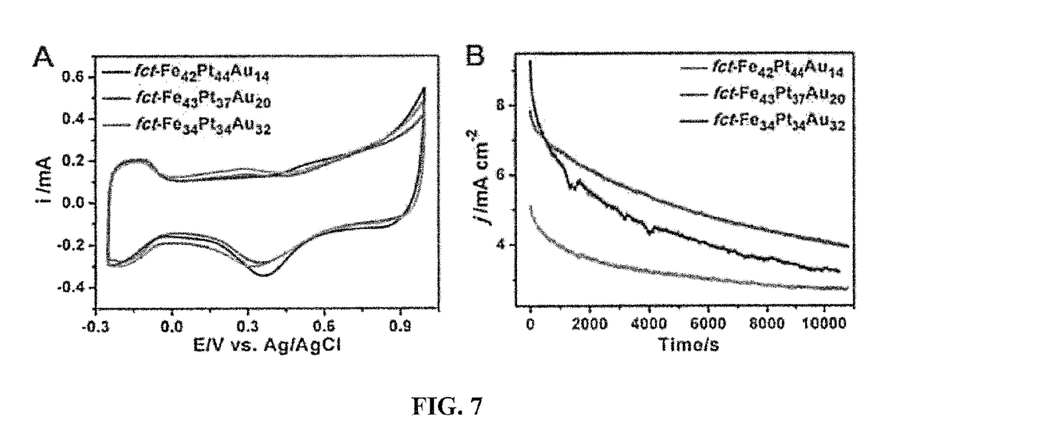
FIG. 7 is a graph of CVs and a graph of j-t curves of the fct-FePtAu NPs.

The effect of Au on FAOR of 4 nm fct-FePtAu NPs was determined to obtain an optimum Au composition for catalytic measurements. FIG. 4 panel A and FIG. 7 panel A show the cyclic voltammograms (CVs) of three different kinds of FePtAu NPs in $N_2$-saturated 0.5 M $H_2SO_4$ solution. The peaks appearing in the range from −0.25 to 0.15 V were determined to be attributed to hydrogen underpotential formation/stripping (HUPD) and were used to estimate the electrochemical active surface area of the NPs (FIG. 7 panel A; Snyder, J. et al. *Nat. Mater.* 2010, 9, 904-907). The peaks at 0.3-0.9 V were determined to be from metal oxidation/reduction: more Au content in the NP structure leads to stronger Au reduction peaks at 0.80 V (FIG. 4 panel A). The electrooxidation activity of these fct-FePtAu NPs in 0.5 M $H_2SO_4$ and 0.5 M HCOOH was normalized to NP surface area and is plotted as current density (J) as a function of the applied potentials (V). See FIG. 4 panel B. For the fct-$Fe_{42}Pt_{44}Au_{14}$ NPs, the first current maximum at 0.47 V in the forward scan was determined to be due to the direct oxidation of HCOOH to $CO_2$ (dehydrogenation reaction), while the second current maximum at 0.71 V corresponds to oxidation of CO generated from the dehydration reaction of HCOOH (Ji, X. et al. *Nat. Chem.* 2010, 2, 286-293).

The stability of these fct-FePtAu NPs was tested by chronoamperometry, as shown in the J change of FAOR as a function of time (t) at 0.2 V (FIG. 7 panel B; Guo, S. et al. *J. Am. Chem. Soc.* 2011, 39, 15354-15357). Among three different kinds of fct-FePAu NPs studied, the fct-$Fe_{43}Pt_{37}Au_{20}$ NPs were observed to have excellent long-term stability.

Example 7

Effect of FePtAu NPs on FAOR Catalysis

Figure 8:
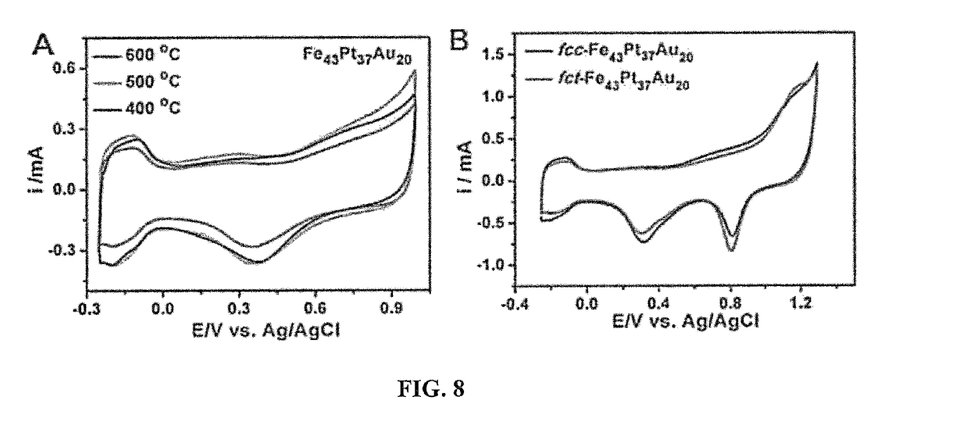
FIG. 8 is a graph of CVs and a graph of j-t curves of $Fe_{43}Pt_{37}Au_{20}$ NPs.
Figure 9:
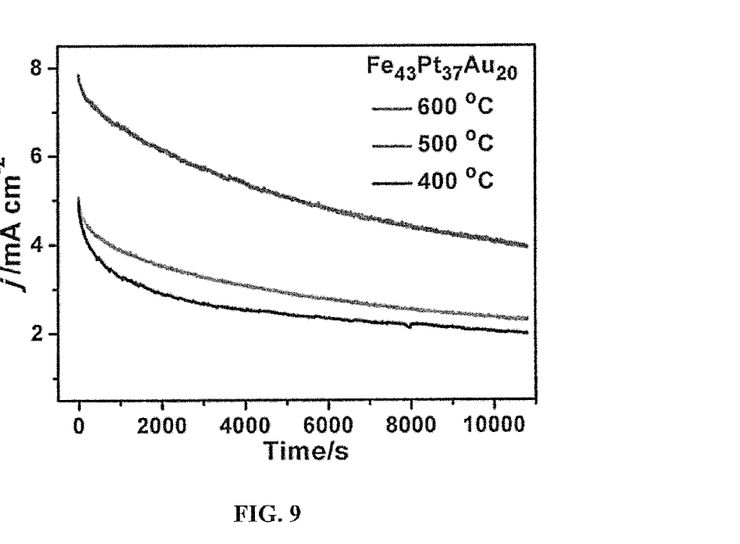
FIG. 9 is a graph of j-t curves of $Fe_{43}Pt_{37}Au_{20}$ NPs annealed at 400° C. (lower), 500° C. (middle) and 600° C. (upper) temperatures.

The effect of the structure of the $Fe_{43}Pt_{37}Au_{20}$ NPs on FAOR catalysis was analyzed. FIG. 8 shows the CVs of $Fe_{43}Pt_{37}Au_{20}$ NPs annealed at different temperatures. With the increase in annealing temperatures from 400 to 600° C., a negative shift in the Pt based reduction peak was observed, indicating better Fe-alloy effect to Pt in fct-FePt than in fcc-FePt structure. The results of FAOR catalyzed by $Fe_{43}Pt_{37}Au_{20}$ NPs annealed at different temperatures are shown in FIG. 4 panel C. The fcc-$Fe_{43}Pt_{37}Au_{20}$ NPs obtained from 400° C. annealing display a clear CO oxidation peak at 0.7 V. Increasing the annealing temperature to 500° C. resulted in a drop in the intensity of this oxidation peak. The NPs annealed at 600° C. for 1 h show no CO oxidation peak, illustrating that the segregation of Au on the surface of the fct-$Fe_{43}Pt_{37}Au_{20}$ NPs assisted in CO removal. The FAOR stability of the $Fe_{43}Pt_{37}Au_{20}$NPs which were annealed at different temperatures is shown in FIG. 9. The $Fe_{43}Pt_{37}Au_{20}$ NPs that were annealed at 600° C. were found to be more stable for FAOR than the NPs that were annealed at 400 and 500° C., indicating that the fct structure enhanced the durability of FePtAu NPs for FAOR.

Figure 10:
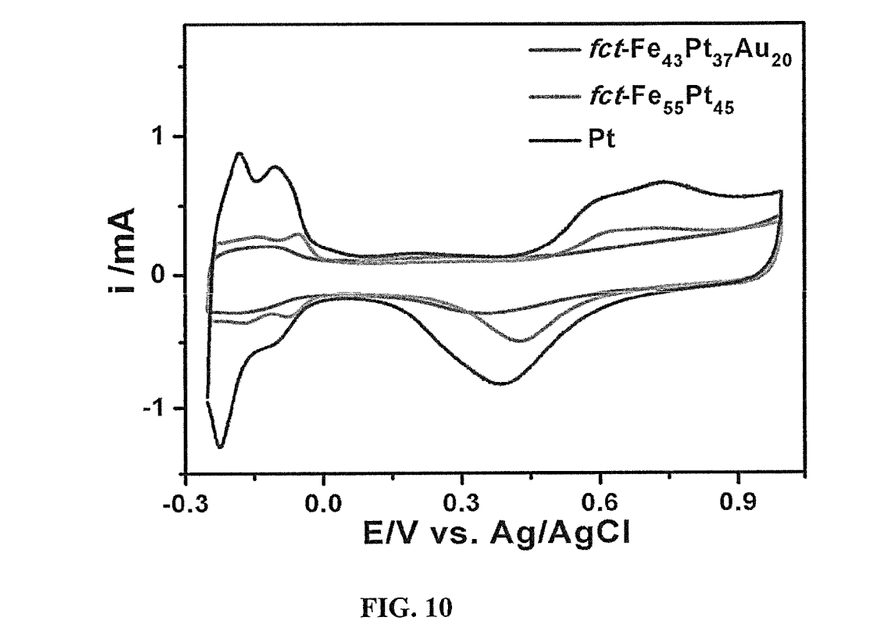
FIG. 10 is a graph of CVs of (inner dark) fct-$Fe_{55}Pt_{45}$ (inner light), and commercial Pt NPs (outer black) in the $N_2$-saturated 0.5 M $H_2SO_4$ solution.
Figure 11:
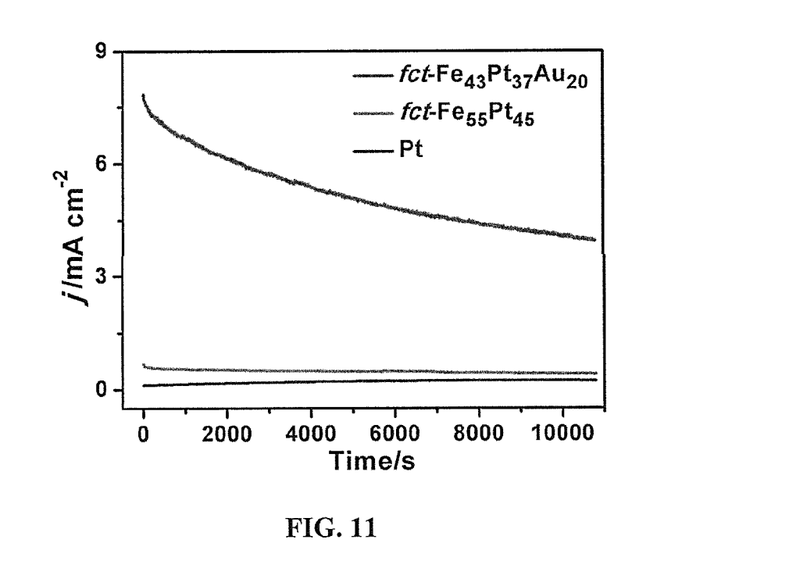
FIG. 11 is a graph of j-t curves of the fct-$Fe_{43}Pt_{37}Au_{20}$ (upper), fct-$Fe_{55}Pt_{45}$, (lower light) and commercial Pt (lower dark) catalysts.

The fct-$Fe_{43}Pt_{37}Au_{20}$ NPs were observed to be much more active and durable catalysts for FAOR than the fct-$Fe_{55}Pt_{45}$ NPs and the commercial Pt NPs. FIGS. 10 and 4D show the comparison of CVs and J-V curves, respectively, for these NPs. The Pt catalyst was observed to have very strong CO oxidation peak at 0.67 V. In contrast, the fct-$Fe_{55}Pt_{45}$ was observed to have a relatively weak peak at 0.69 V, and the fct-$Fe_{43}Pt_{37}Au_{20}$ NPs have no CO oxidation peak. Without the CO-poisoning effect, the fct-$Fe_{43}Pt_{37}Au_{20}$ NPs have an onset FAOR potential at −0.2 V, which is 0.12 V lower than that of the commercial Pt (−0.08 V). The mass activity of the 4 nm fct-$Fe_{43}Pt_{37}Au_{20}$ NPs reaches 2809.9 mA/mg Pt (FIG. 4 panel E), which is the highest among all NP catalysts reported. Furthermore, the fct-$Fe_{43}Pt_{37}Au_{20}$ NPs are also the most stable NP catalysts for FOAR: their specific activity drops about 50% at the end of a 3 h J-t test (FIG. 11). Even after a 13 hour J-t test, the mass activity of fct-$Fe_{43}Pt_{37}Au_{20}$ NPs was still at 2600 mA/mg Pt (92.5% of the original value of 2809.9 mA/mg Pt) (FIG. 4 panel F). In comparison, under the same measurement conditions, the state-of-art PtBi NPs have the mass activity of about 1720 mA/mg Pt and can keep only about 11% of their initial activity at the end of a 3 hour test (Ji, X. et al. *Nature Chem.* 2010, 2, 286-293).

The fct-FePtAu structure with Au segregating on the FePt surface was determined to be an important characteristic for the NPs to show enhanced activity and durability for FAOR. With the increase of Au amount to 20% and 32% in the fct-$Fe_{43}Pt_{37}Au_{20}$ and fct-$Fe_{34}Pt_{34}Au_{32}$ NPs, respectively, the CO-related peak in FAOR disappears, indicating that Au on the NP surface promotes the dehydrogenation reaction of HCOOH and inhibits the dehydration reaction that leads to the formation of CO. Au helps to boost the formation of $HCOO_{ads}$ i.e. adsorbed HCOO and its spillover to Pt to facilitate the dehydrogenation pathway (Zhang, S. et al. *Angew. Chem., Int. Ed.* 2010, 49, 2211-2214). The enhanced stability likely comes from the formation of fct structure within fct-FePtAu NPs promoted by Au doping and segregation. Without the presence of Au and the formation of fct structure Pt, FePt, and fcc-FePtAu NPs are subject to easy CO poisoning and acid dissolution, exhibiting much lower activity and stability for FAOR than the fct-FePtAu NPs.

Example 8

FePtAu NPs Catalyze Methanol Oxidation Reactions

The fct-$Fe_{43}Pt_{37}Au_{20}$ NPs described herein are also active for catalyzing methanol oxidation reactions with a high CO-tolerance activity. The results of catalysis of methanol oxidation reaction by fct-$Fe_{43}Pt_{37}Au_{20}$ NPs is shown in FIG. 12, which is a graph of CVs of fct-$Fe_{43}Pt_{37}Au_{20}$, (top closed curve), fcc-$Fe_{43}Pt_{37}Au_{20}$ (second closed curve from the top), fct-$Fe_{55}Pt_{45}$ (light closed curve), and commercial Pt NPs (third closed curve from the top) in the $N_2$-saturated 0.5 M $H_2SO_4$ and 0.5 M methanol solution. Two oxidation peaks are typically observed in a methanol oxidation reaction. The stronger peak in the forward scan is related to the direct methanol oxidation and the smaller peak in the backward scan is associated with oxidation of carbonaceous species formed on the catalyst surface in the forward scan. The ratio of the forward peak current ($I_f$) to the backward peak current ($I_b$), $I_f/I_b$, is used as an index to measure the catalyst tolerance to the poisoning species such as CO. A higher ratio indicates more effective removal of the poisoning species on the catalyst surface (Yin, A et al. *J. Am. Chem. Soc.* 2011, 133, 3816; Mu, Y. et al. *J. Phys. Chem. B* 2005, 109, 22212). The CV from the fct-$Fe_{43}Pt_{37}Au_{20}$ NPs has an $I_f/I_b$ value of 2.8, while for the fcc-$Fe_{43}Pt_{37}Au_{20}$, fct-$Fe_{55}Pt_{45}$ and commercial Pt NP catalysts, the values decrease to 1.62, 1.20, and 0.71 respectively.

What is claimed is:

1. A method of manufacturing FePtAu nanoparticle (NP) catalyst comprising:
    co-reducing platinum acetylacetone ($Pt(acac)_2$) and chloroauric acid hydrate ($HAuCl_4.xH_2O$) by mixing each in a solvent in the presence of oleylamine and tetradecylphosphonic acid, and heating to form a solution;
    adding iron pentacarbonyl ($Fe(CO)_5$) to the solution and further heating the solution, thereby thermally decomposing ($Fe(CO)_5$) and obtaining nanoparticles;
    separating by precipitation and purifying the nanoparticles thereby obtaining as-synthesized nanoparticles; and,
    annealing the as-synthesized nanoparticles at a high temperature, whereby surfactant materials on or coating the as-synthesized nanoparticles are removed, and the as-synthesized nanoparticles are converted by a high temperature transition from a structure that is chemically disordered face centered cubic, fcc-FePtAu, to a chemically ordered face centered tetragonal, fct-FePtAu, thereby obtaining the FePtAu NP catalyst.

2. The method according to claim 1, wherein the as-synthesized nanoparticles are annealed at a temperature range of about 400-650° C. for about 1 hour.

3. The method according to claim 1 further comprising prior to annealing, depositing the as-synthesized nanoparticles on a solid support, wherein the solid support prevents aggregation/sintering of the nanoparticles during the high temperature annealing.

4. The method according to claim 3 wherein the solid support is Ketjen carbon.

5. The method according to claim 1, wherein prior to obtaining nanoparticles the method further comprises selecting a molar ratio of components $(Pt(acac)_2)$, $(HAuCl_4 \cdot xH_2O)$ and $(Fe(CO)_5)$.

6. A method of using trimetallic FePtAu nanoparticle (NP) catalyst for promoting a formic acid oxidation reaction (FAOR), the method comprising oxidizing formic acid (HCOOH) in an electrochemical cell in the presence of $N_2$-saturated sulfuric acid ($H_2SO_4$) and the NP catalyst.

7. The method according to claim 6 wherein the trimetallic FePtAu nanoparticle (NP) catalyst has a chemically ordered face-centered tetragonal (fct) structure, in which Fe and Pt atoms alternate in atomic layers along one direction and Au is enriched on the surface of the FePtAu NP.

8. The method according to claim 7, wherein oxidizing HCOOH is essentially due to direct oxidation of HCOOH to $CO_2$.

9. The method according to claim 7, wherein the concentration of $H_2SO_4$ is 0.1 to 1.0 molar (M).

10. The method according to claim 7, wherein the concentration of HCOOH is 0.2 to 2.0 M.

* * * * *